United States Patent
Qin et al.

(10) Patent No.: US 9,156,198 B2
(45) Date of Patent: Oct. 13, 2015

(54) TEMPERATURE CONTROLLED MOLDING OF COMPOSITE COMPONENTS

(75) Inventors: Jichen Qin, Zhuhai (CN); Charles R. Hill, Loudonville, OH (US); Richard Dale Michonski, Marengo, IL (US); Zhong Wang, Shen Zhen (CN); Weineng Jiang, Doumen (CN); Marlon M. Lalican, Doumen (CN)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 13/560,506

(22) Filed: Jul. 27, 2012

(65) Prior Publication Data

US 2013/0026678 A1    Jan. 31, 2013

Related U.S. Application Data

(60) Provisional application No. 61/512,221, filed on Jul. 27, 2011.

(51) Int. Cl.
*B29C 45/14* (2006.01)
*B29C 45/73* (2006.01)
(Continued)

(52) U.S. Cl.
CPC ........... *B29C 45/14778* (2013.01); *B29C 45/73* (2013.01); *B29C 2045/14877* (2013.01);
(Continued)

(58) Field of Classification Search
CPC ...... B29C 45/14; B29C 70/78; B29C 70/467; B29C 70/345; B29C 70/36; B29C 70/64; B29C 2045/14286; B29C 70/40; B29C 70/681; B29C 70/682; B29C 2045/7356

USPC .......................................................... 264/279
See application file for complete search history.

(56) References Cited

U.S. PATENT DOCUMENTS 2,357,706 A    9/1944  Toepperwein
2,494,777 A *  1/1950  Patterson et al. ............. 425/308
(Continued)

FOREIGN PATENT DOCUMENTS

JP    2004-268936        9/2004
WO   2004-041532 A1     5/2004
WO   2005-109984 A2    11/2005

OTHER PUBLICATIONS

Jeng, M.-C. et al., Rapid mold temperature control in injection molding by using steam heating, International Communications in Heat and Mass Transfer, vol. 37 (2010), pp. 1295-1304.*
(Continued)

*Primary Examiner* — Matthew Daniels
(74) *Attorney, Agent, or Firm* — Haverstock & Owens LLP

(57) ABSTRACT

Systems and processes that limit distortion of inserts (e.g., previously formed parts) in insert molding and overmolding processes. Initially, a mold may be closed (e.g., clamped) about an insert with the mold at a first temperature. After closing the mold about the insert, the mold is heated up to a second temperature (e.g., a temperature suitable for injection of the molding material) and filled with the molding material to contact (e.g., encapsulate) the insert. After the mold has been cooled, the mold may be opened and the finished part (including the insert and the solidified molding material) removed (e.g., ejected). The process may be repeated for additional finished parts. Closing the mold about the insert before heating the mold to the injection temperature advantageously limits distortion of the insert that would otherwise occur by placing the insert into the mold with the mold already at the injection temperature.

18 Claims, 7 Drawing Sheets

(51) Int. Cl.
   *B29K 305/02* (2006.01)
   *B29K 305/00* (2006.01)
(52) U.S. Cl.
   CPC . *B29C2045/7343* (2013.01); *B29C 2045/7356* (2013.01); *B29C 2045/7393* (2013.01); *B29K 2305/00* (2013.01); *B29K 2305/02* (2013.01)

(56) References Cited

U.S. PATENT DOCUMENTS

| | | | |
|---|---|---|---|
| 2,632,088 | A | 3/1953 | Meyrick et al. |
| 3,122,598 | A * | 2/1964 | Berger .......................... 264/247 |
| 3,259,175 | A | 7/1966 | Kraus et al. |
| 3,378,245 | A | 4/1968 | Frank |
| 3,847,209 | A | 11/1974 | Mascall |
| 4,026,299 | A | 5/1977 | Sauder |
| 4,251,479 | A | 2/1981 | Pecht et al. |
| 4,373,574 | A | 2/1983 | Schafer |
| 4,680,001 | A | 7/1987 | Waters |
| 5,376,317 | A | 12/1994 | Maus et al. |
| 5,427,720 | A | 6/1995 | Kotzab |
| 5,591,220 | A | 1/1997 | Mahawili |
| 5,776,514 | A | 7/1998 | Wu et al. |
| 5,946,925 | A | 9/1999 | Williams et al. |
| 6,190,598 | B1 | 2/2001 | Murphy et al. |
| 6,290,882 | B1 | 9/2001 | Maus et al. |
| 6,312,628 | B1 | 11/2001 | Wieder et al. |
| 6,322,343 | B1 | 11/2001 | Yoda et al. |
| 6,499,535 | B2 | 12/2002 | Cowans |
| 6,574,096 | B1 | 6/2003 | Difonzo et al. |
| 6,620,371 | B1 * | 9/2003 | Winget et al. ................. 264/513 |
| 6,699,349 | B1 * | 3/2004 | Sporle et al. ............. 156/244.12 |
| 6,768,654 | B2 | 7/2004 | Arnold et al. |
| 6,775,996 | B2 | 8/2004 | Cowans |
| 6,955,784 | B1 | 10/2005 | Zanella et al. |
| 6,991,756 | B2 | 1/2006 | Saeki et al. |
| 7,290,587 | B2 | 11/2007 | Ward |
| 7,323,127 | B2 | 1/2008 | Muranaka et al. |
| 8,367,210 | B2 | 2/2013 | Naritomi et al. |
| 2004/0130828 | A1 | 7/2004 | Bagaoisan et al. |
| 2004/0173928 | A1 | 9/2004 | Suh |
| 2004/0188886 | A1 | 9/2004 | Yamashita et al. |
| 2005/0150635 | A1 | 7/2005 | Luebke |
| 2006/0196957 | A1 | 9/2006 | Johnson |
| 2006/0257624 | A1 | 11/2006 | Naritomi et al. |
| 2007/0034352 | A1 | 2/2007 | Lee |
| 2007/0063061 | A1 | 3/2007 | Nagasaka |
| 2007/0158056 | A1 | 7/2007 | Dickinson et al. |
| 2008/0111280 | A1 | 5/2008 | Choe et al. |
| 2009/0260871 | A1 | 10/2009 | Weber |
| 2010/0159061 | A1 | 6/2010 | Chen et al. |

OTHER PUBLICATIONS

Wang, G. et al., Research of thermal response simulation and mold structure optimization for rapid heat cycle molding processes, respectively, with steam heating and electric heating, Materials and Design, vol. 31 (2010), pp. 382-395.*

Guilong, W., Z. Guoqun, L. Huiping, G. Yanjin, Analysis of thermal cycling efficiency and optimal design of heating/cooling systems for rapid heat cycle injection molding process, Materials and Design, vol. 31 (2010), pp. 3426-3441.*

Jeng, M.-C. et al., Rapid Mold temperature Control in Injection Molding by Using Steam Heating, International Communications in Heat and MAss transfer, vol. 37(2010), pp. 1295-1304.

* cited by examiner

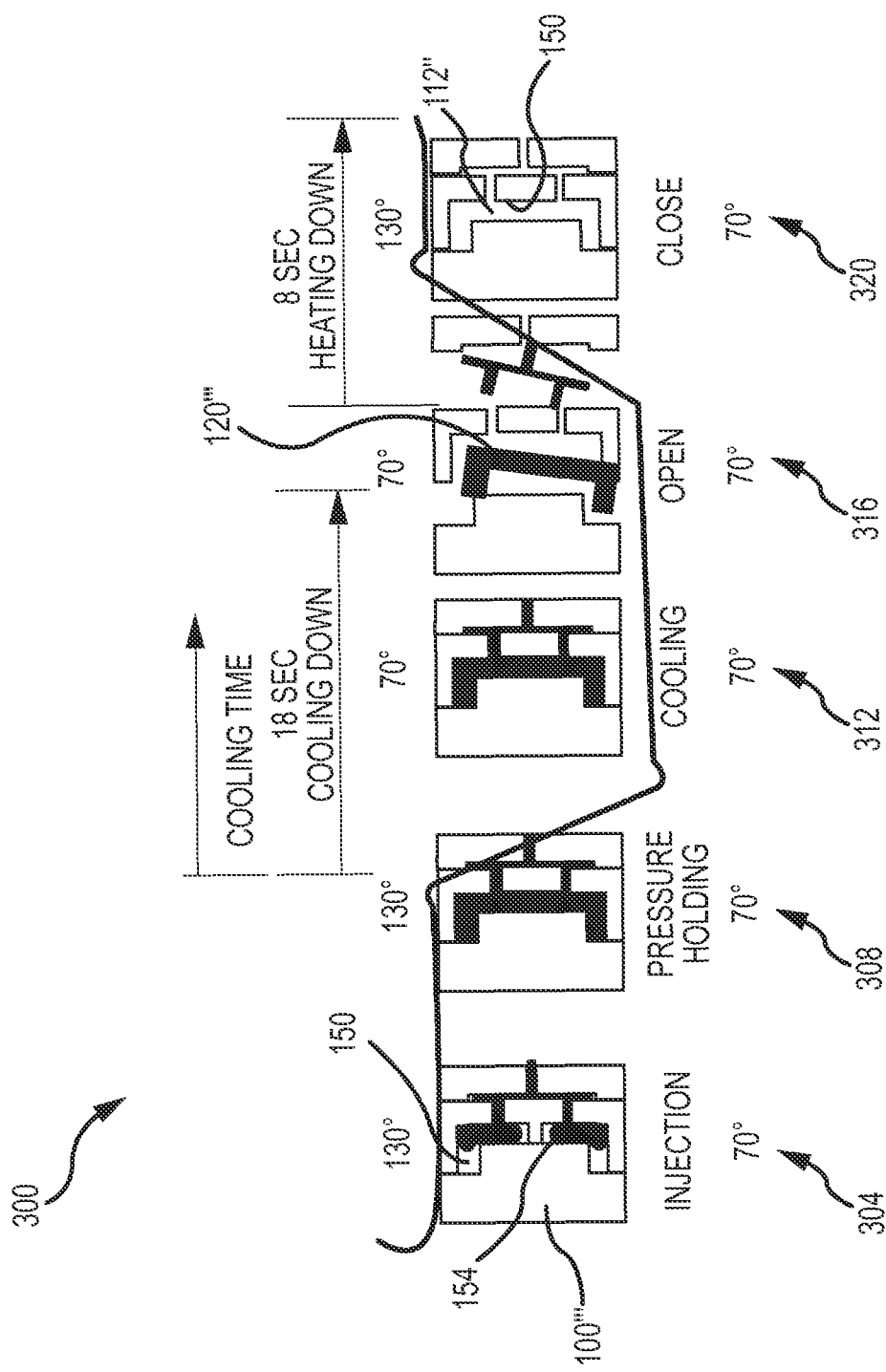

TEMPERATURE CONTROLLED MOLDING OF COMPOSITE COMPONENTS

CROSS-REFERENCE TO RELATED APPLICATIONS

This application claims priority to U.S. patent application No. 61/512,221, entitled "System and Method for Temperature Controlled Molding of Composite Components," and filed on Jul. 27, 2011; the entire contents of this application are incorporated herein by reference.

BACKGROUND

In the manufacturing industry, injection molding is a common process for producing parts. Conventional injection molding often requires the use of a constant-temperature mold, an injection molding machine, and raw molding material or resin (e.g., molten plastic). The mold includes a first mold plate or member and a second mold plate or member that together, define the shape of a part or multiple parts being molded. The injection molding machine is responsible for heating the raw plastic material until liquefied and then injecting the molten plastic into the mold.

The conventional injection molding process generally includes a clamping stage, an injection stage, a cooling stage, and a removal stage. In the clamping stage, the core side and cavity side are clamped shut while the raw plastic is being melted within the injection mold machine. Then, in the injection stage, the molten plastic is injected and packed into the cavity of the mold. In the cooling stage, the mold remains clamped while the molten plastic cools and solidifies into the final or finished part. Finally, in the removal stage, the mold is unclamped and the newly formed part is removed via, for example, one or more ejector pins. After the part is ejected, the cycle is typically repeated.

In some situations, composite parts are formed by molding features into direct contact with previously formed parts. For instance, "insert molding" (e.g., metal insert molding, nano-molding, in-mold metal plastic bonding, etc.) and "overmolding" generally involve placing at least one insert (i.e., the previously formed part) into the mold cavity, clamping the first and second mold members about the insert, injecting a molding material (e.g., high temperature plastics such as polyphenylene sulfide (PPS), polyphthalamide (PPA), and/or the like) into the mold cavity, allowing the mold to cool, and then ejecting the finished part which includes the insert in contact with (e.g., encapsulated by, adjacent to, integrated with, etc.) the solidified plastic material. Currently, overmolding and metal insert molding processes run at constant mold temperatures. When molding plastics such as PPS and PPA, for instance, the constant mold temperature has to be very high in order to yield an acceptable finished product.

SUMMARY

Disclosed herein is an injection molding process including placing a previously-formed part (e.g., formed of metal and/or plastic) into a cavity of a mold; heating, after the placing, the mold from a first temperature up to a second temperature; and injecting, at the second temperature, a molding material into the cavity so as to contact the previously-formed part.

Before the placing operation, the mold may be cooled from a third temperature down to the first temperature, where the third temperature is less than the second temperature. The placing may include disposing the previously-formed part between first and second mold members of the mold and moving at least one of the first and second mold members towards the other of the first and second mold members to secure the previously-formed part within the mold cavity, where the first and second mold members are configured to limit distortion of the previously-formed part during the heating. During and/or after the injecting, the process may include maintaining a holding pressure on the previously-formed part with the first and second molding members.

The process may include cooling, after the injecting, the mold from the second temperature down to a third temperature; and removing a finished part from the mold, where the finished part includes the previously-formed part and the injected molding material. The third temperature may be substantially equal to the first temperature of different than the first temperature. The removing may include moving at least one of first and second mold members of the mold away from the other of the first and second mold members, and ejecting the finished part from the mold. After the removing, the process may include continuing to perform the placing, heating, injecting, cooling and removing operations to create additional finished parts. Each of the cooling and heating may include flowing a heat transfer media through the mold. The heating may include energizing a heater.

Also disclosed herein is an injection molding process including closing a mold about a solidified component; heating, after the closing, the mold from a first temperature up to a second temperature; injecting, during or after the heating, a molding material into the cavity so as to contact the solidified component; allowing the mold to cool down to a third temperature less than the second temperature so that the molding material solidifies; opening the mold; and removing a finished part from the mold, where the finished part includes the solidified component and the solidified molding material. For instance, the process may include continuing to perform the closing, heating, injecting, allowing, opening and removing operations to create additional finished parts.

Also disclosed herein is a system including a processing module; and a memory module logically connected to the processing module and comprising a set of computer readable instructions executable by the processing module to heat a mold from a first temperature up to a second temperature, wherein the mold includes a previously formed component closed inside a cavity of the mold; inject a molding material into the cavity so as to contact the previously formed component; cool the mold down to third temperature less than the second temperature to solidify the molding material; and remove a finished part from the cavity, wherein the finished part includes the previously formed component and the solidified molding material. For instance, the first and third temperatures may be the same or different.

BRIEF DESCRIPTION OF THE DRAWINGS

FIG. 5 illustrates one cycle of a variable mold temperature injection molding process, according to one embodiment.

DETAILED DESCRIPTION

The present disclosure is broadly directed to systems and processes for use with insert molding and/or overmolding processes that serve to eliminate or at least limit distortion of the insert(s) during the molding process due to use of constant, high mold temperatures. In current overmolding and/or metal-insert molding processes, high mold temperatures often cause the inserted parts to distort. For example, thin plastic parts, aluminum parts, stainless steel parts, and multilayered clad metal parts often distort when put into an open injection mold that has a high temperature. As a result, it becomes difficult to accurately position and hold the insert part in the mold, thus making it difficult to control the final dimensions of the finished product. Oftentimes, distortion of the insert part can inhibit the mold from being closed properly thereby resulting in defects in the finished part. If a finished part has distortion after molding, it may need to be calibrated with fixtures to meet any appropriate specifications.

In this regard, the present systems and processes serve to implement at least one first mold temperature when the insert is placed into the mold and at least one higher second mold temperature at which the molten plastic or other material can be shot into the mold and into contact with the insert. Once the mold has been allowed to cool back down to the first temperature (or at least a temperature less than the second temperature), the mold can be opened and the finished part removed (e.g., ejected) to allow for insertion of another insert into the mold. For instance, a variable mold temperature control process can be used to cycle the mold between at least the first and second temperatures to allow for the manufacturing of a successive plurality of finished parts. By placing the insert into the mold at a lower mold temperature and closing the mold before heating the mold (and thus the insert) to a higher temperature at which the molding material can be injected, temperature "shocks" to the insert (e.g., due to temperature differences between the insert and high mold temperatures of current constant mold temperature systems during initial placement of the insert into the mold) and the resultant distortion/breakage of the insert and/or difficultly in properly closing the mold can be controlled or even eliminated. That is, any distortion that may have otherwise occurred as the insert is being heated in the mold are prevented or at least controlled by opposing portions of the mold (e.g., movable and stationary platens) being compressed or clamped around the insert during the heating process.

Figure 1A:
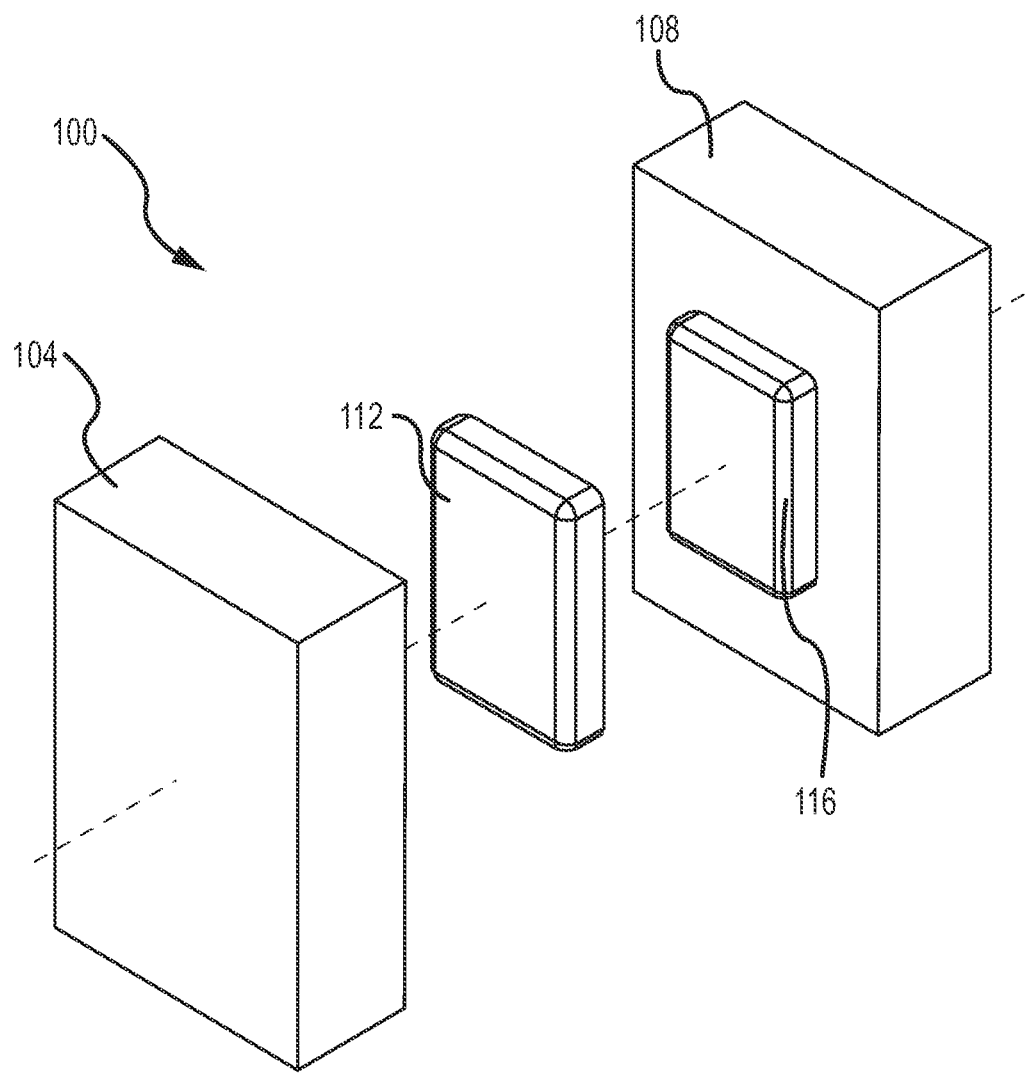
FIG. 1a illustrates a low temperature mold in an open position with an insert placed within the mold, according to one embodiment.
Figure 1B:
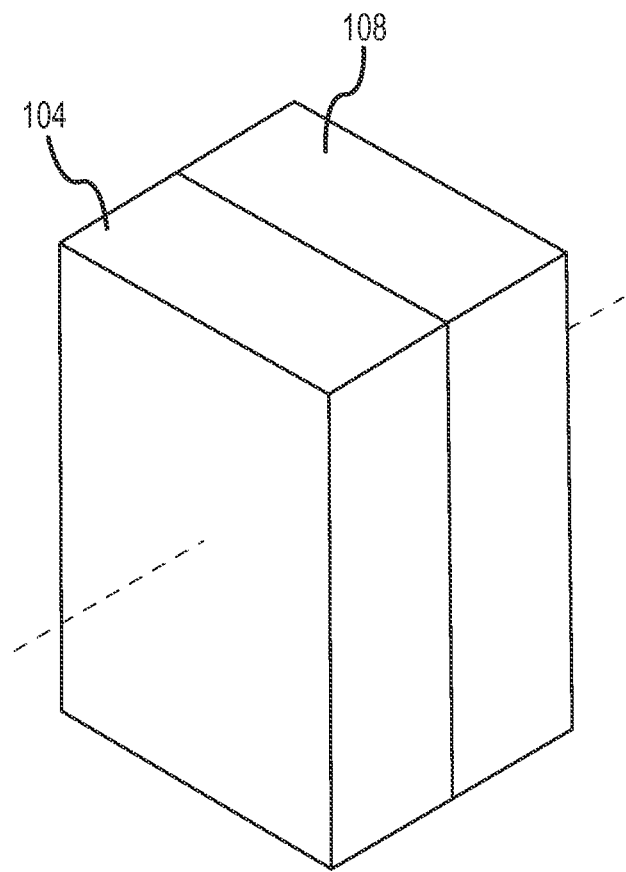
FIG. 1b illustrates the mold of FIG. 1a, but in a closed position about the insert.

Turning now to FIG. 1a, a perspective view of a mold 100 is illustrated that may be used to perform the variable mold temperature insert molding and overmolding processes disclosed herein. Broadly, the mold 100 may include at least a first mold member 104 and a second mold member 108 that are configured to move between at least an open position (as shown in FIG. 1a) that allows for appropriate placement of an insert 112 (e.g., a previously formed or solidified part of any appropriate material) into the mold 100 as well as removal of finished parts from the mold 100, and a closed position (as shown in FIG. 1b) that secures the insert 112 within a cavity (not shown) between the first and second mold members 104, 108 and allows molding material (e.g., high temperature liquid plastic, not shown) to be injected (e.g., shot) into the cavity. For instance, one of the first and second mold members 104, 108 may be referred to as the "injection mold" (e.g., A plate, stationary platen, etc.) including one or more sprues (e.g., openings, holes, etc., not shown) through which molten plastic or the like enters the mold cavity while the other of the first and second mold members 104, 108 may be referred to as the "ejector mold" (e.g., B plate, movable platen, etc.) which is operable to move back and forth relative to the injection mold (e.g., via a hydraulic press) between the open and closed mold positions.

In one arrangement, the mold 100 may be designed so that the finished part remains on the ejector mold as the ejector mold is being moved away from the injection mold. Ejector pins or the like may be included in the mold 100 (e.g., on the ejector mold) to eject or otherwise push the finished part out of the mold 100 in preparation for manufacturing of subsequent finished parts. The mold 100 may be included as part of an injection molding machine or system including a number of various components (e.g., hopper; barrel; molding material; temperature sensors; system controller including memory with any appropriate logic operable to control the system, processor to execute the logic, storage, etc; and/or the like) which have not been specifically discussed in the interest of clarity. For instance, many of the components of the injection molding systems disclosed in U.S. Patent Application Publication Numbers 2007/0063061 and 2010/0187709 and U.S. Pat. No. 4,251,479 may be used with the mold 100 and variable mold temperature insert molding and overmolding processes disclosed herein, and the entire contents of these publications are hereby incorporated by reference as if set forth in full.

Figure 2:
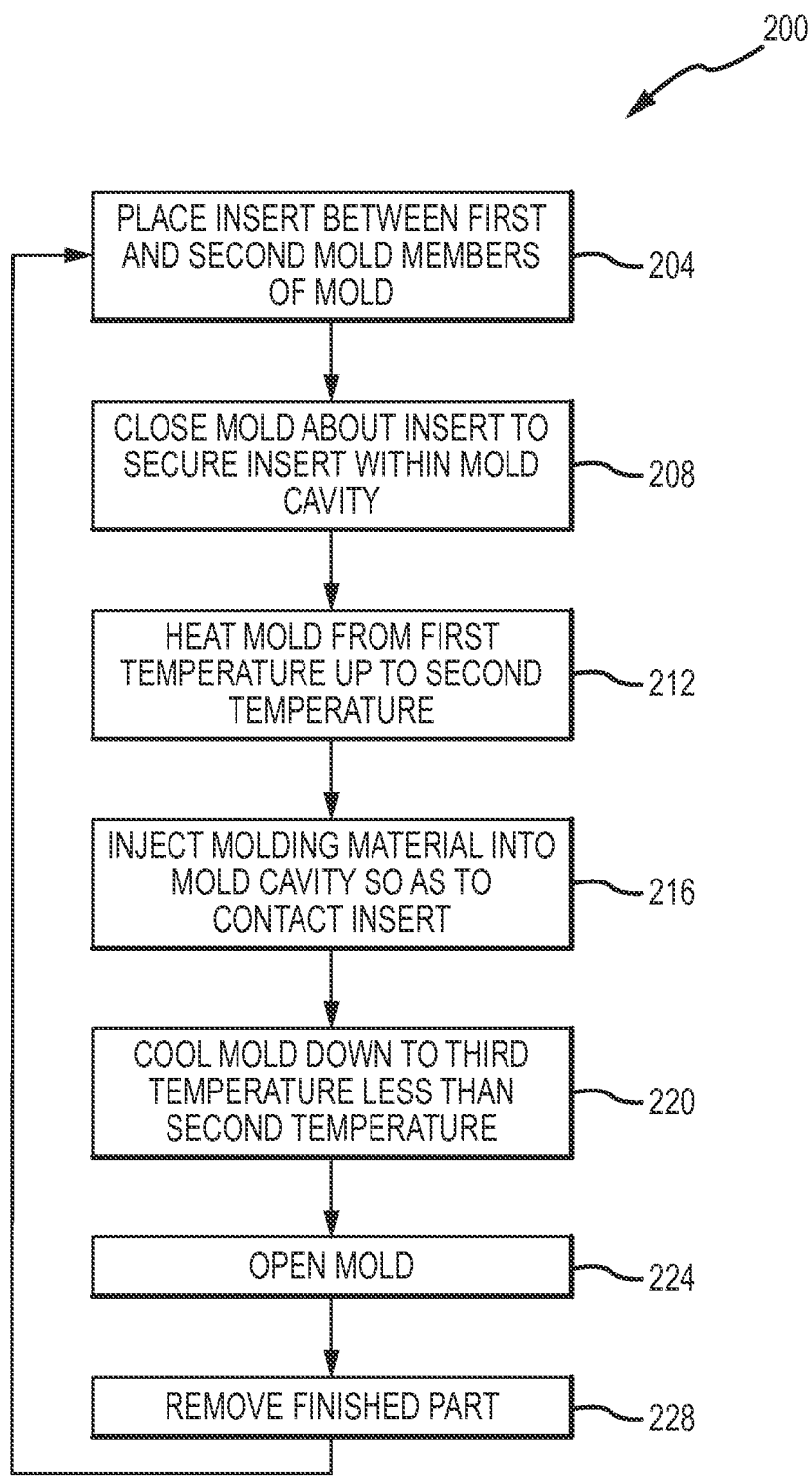
FIG. 2 is a flow diagram illustrating a method of performing a variable mold-temperature insert molding or overmolding process, according to one embodiment.

With additional reference now to FIG. 2, a method 200 of performing a variable mold temperature insert molding and/or overmolding process according to the teachings disclosed herein is shown. The method 200 may include placing 204 an insert 112 (e.g., thin plastic parts, aluminum parts, stainless steel parts, multi-layer clad metal parts, and/or the like) between first and second mold members 104, 108 of a mold 100 (e.g., as in FIG. 1a) and then closing 208 the mold 100 about the insert 112 to secure the insert 112 within the mold cavity (e.g., as in FIG. 1b). The mold 100 may include any appropriate arrangement (e.g., devices, features, etc.) to substantially ensure accurate positioning/orientation of the insert 112 so that the mold 100 may be properly closed (e.g., so that the insert 112 may be properly positioned or otherwise disposed within the mold cavity once the first and second mold members 104, 108 have been brought together to close the mold 100). As just one example, one of the first and second mold members 104, 108 may include a protrusion 116 sized and/or shaped to mate with a corresponding cavity or opening in the insert 112 and that aids at least in initially positioning the insert 112 relative to the one of the first and second molding members 104, 108. See FIG. 1a. After placing the insert 112 over the protrusion 116, the mold 100 may be closed (e.g., moving/clamping the first mold member 104 towards/against the second mold member 108) to secure the insert 112 within the cavity against movement relative to the mold 100.

In any event, and upon clamping of the first and second mold members 104, 108 about the insert 112, the insert 112 is generally restricted from subsequent movement (e.g., distortion) due to its placement within the walls of the cavity (e.g., and over the protrusion 116, if included). That is, any distortion or the like of the insert 112 that may otherwise occur may be substantially immediately prevented or at least restricted by the walls of the cavity and/or protrusion. Furthermore, at least a portion of the mold cavity is in direct contact with at least a portion of the insert 112 as well as with the sprues/ passageways (not shown) that direct the molten molding material into the cavity. In this regard, molding material that is injected into the cavity may make direct contact with the insert 112 so as to encapsulate the insert 112, become integrated with the insert 112, and/or the like.

As discussed previously, current insert molding and overmolding processes utilize constant, high mold temperatures due to the use of high temperature molding materials such as PPS, PPA, and/or the like. However, such high mold temperatures can lead to distortion of the insert upon placement into an open mold (i.e., a mold in an open position) which creates difficulties in relation to positioning and holding the insert in the mold, proper closure of the mold, controlling the final dimensions of the finished part, and/or other types of defects in the finished part. For instance, and in the event that the mold 100 of FIG. 1a was at a high temperature suitable for injection of molten plastic upon placement of the insert 112 onto the protrusion 116 and before the first and second mold members 104, 108 have been clamped together, the insert 112 may be susceptible to distortion (e.g., in a direction away from the protrusion 116) due to contact of the high temperature mold 100 with the lower temperature insert 112.

In this regard, and with reference again to FIG. 2, the method 200 may include heating 212 the mold 100 from a first temperature up to a second temperature (e.g., a temperature suitable for injection of the molding material which may be dictated by one or more factors such as type of molding material, shape/dimensions of mold cavity, etc., such as about 115° C.-145° C., or about 125° C.-135° C.) and then injecting 216 molding material into the mold cavity so as to make contact with the insert 112. That is, and in contrast to current insert molding and overmolding processes that utilize constant, high mold temperatures, the method 200 of FIG. 2 includes closing/clamping the mold 100 about the insert 112 to secure the insert 112 within the mold cavity with the mold at a first temperature (e.g., a temperature lower than the second temperature or, in other words, a temperature less likely to cause distortion of the insert 112 upon contact or near contact of the insert 112 with the mold 100) and then heating the mold 100 up to the second temperature.

As an example, it has been found that first mold temperatures in the range of about 60° C.-80° C., such as about 65° C.-75° C., can limit distortion of an insert upon contact of the insert with a mold. Substantially any tendency of the insert 112 to distort or otherwise change shape as the mold 100 is being heated from the first temperature to the second temperature may be inhibited or otherwise controlled/restricted by the outer walls of the mold cavity being closely shaped to the shape and dimension of the insert 112. Heating 212 of the mold 100 may be accomplished in any appropriate manner such as via electric heating, induction, heating, heat transfer media (e.g., hot water, steam, hot oil, etc.) cycling or otherwise flowing through passageways extending through one or both of the first and second mold members 104, 108 designed to effect transfer of heat from the heating media to the mold 100, and/or the like. For instance, various examples of mold heating arrangements are discussed in U.S. Patent Application Publication Numbers 2007/0063061 and 2010/0187709 and U.S. Pat. No. 4,251,479, all of which have already been incorporated herein by reference as if set forth in full.

Figure 1C:
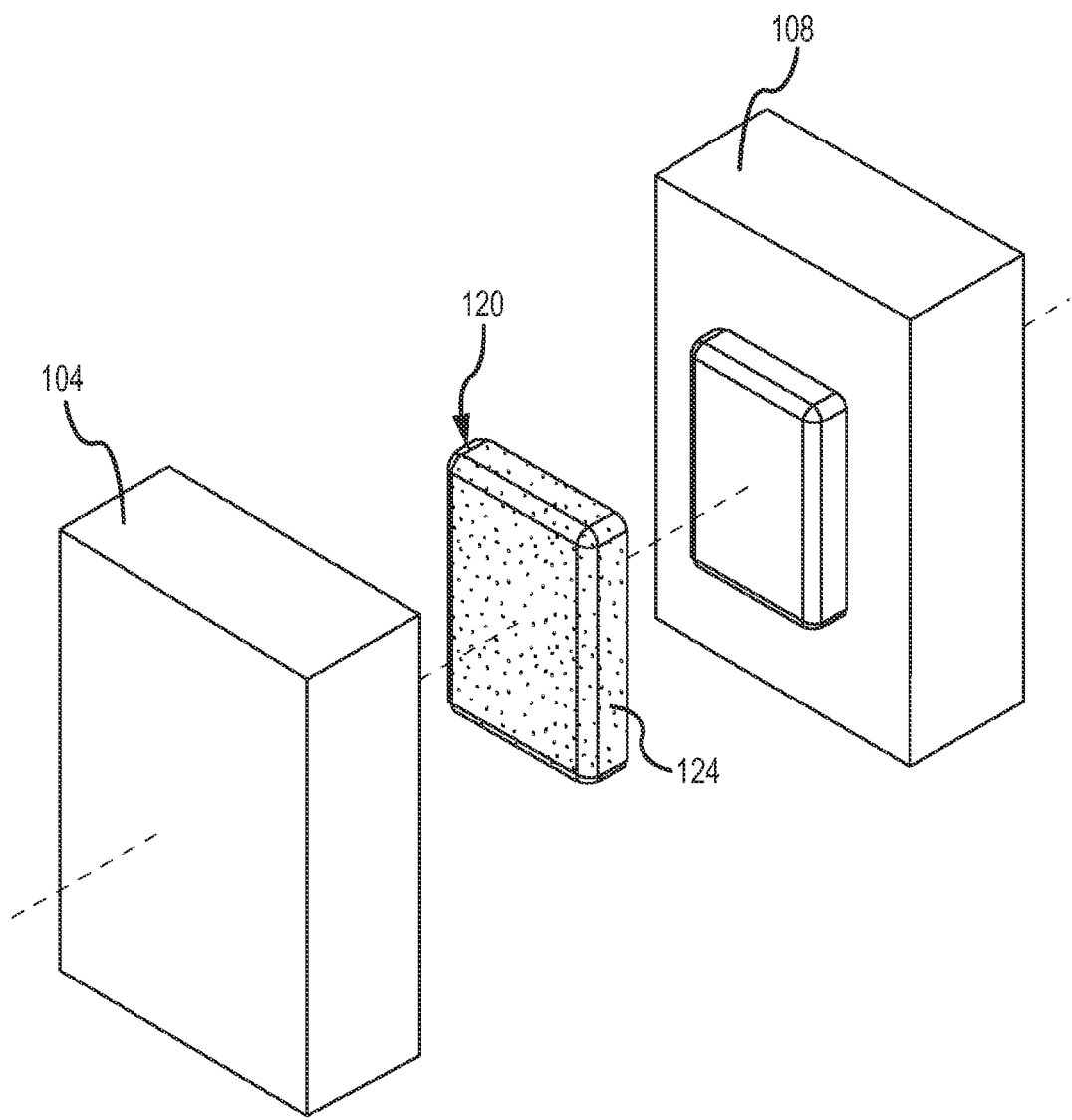
FIG. 1c illustrates the mold of FIG. 1b in an open position and showing a finished part that includes the insert and solidified molding material in contact with the insert.

After the molding material has been injected 216 into the mold cavity to make contact with the insert 112, the method 200 may include cooling 220 the mold 200 down to a third temperature less than the second temperature (e.g., a temperature suitable to cause appropriate solidification of the molten molding material for subsequent removal and handling), opening 224 the mold 100, and removing 228 (e.g., ejecting) a finished part 120 from the mold 100, where the finished part 120 includes the insert in contact with the solidified molding material. For instance, FIG. 1c illustrates an example whereby the insert 112 (not shown) has been encapsulated by solidified molding material 124 to form the finished part 120 (e.g., mobile phone or notebook cover/shell). The third mold temperature may be the same as or different than the first mold temperature (e.g., greater than or less than the first mold temperature) so long as it is less than the second mold temperature. Stated differently, the third mold temperature may be closer to the first mold temperature than the second mold temperature but still different than the first mold temperature.

Cooling 220 of the mold 100 may be accomplished in any appropriate manner such as via cooling/heat transfer media (e.g., cold water, cold oil, liquid nitrogen, etc.) cycling or otherwise flowing through passageways (e.g., the same as or different than the heating passageways) extending through one or both of the first and second mold members 104, 108 designed to effect transfer of heat from the mold 100 to the cooling media, and/or the like. For instance, various examples of mold cooling arrangements are discussed in U.S. Patent Application Publication Numbers 2007/0063061 and 2010/0187709 and U.S. Pat. No. 4,251,479, all of which have already been incorporated herein by reference as if set forth in full. In conjunction with the cooling 220, the first and second mold members 104, 108 may be clamped against one another (e.g., by applying a holding pressure) to limit the high pressure injected molding material from forcing the first and second molding members 104, 108 apart before the mold 100 and molding material has fully cooled.

Figure 3:
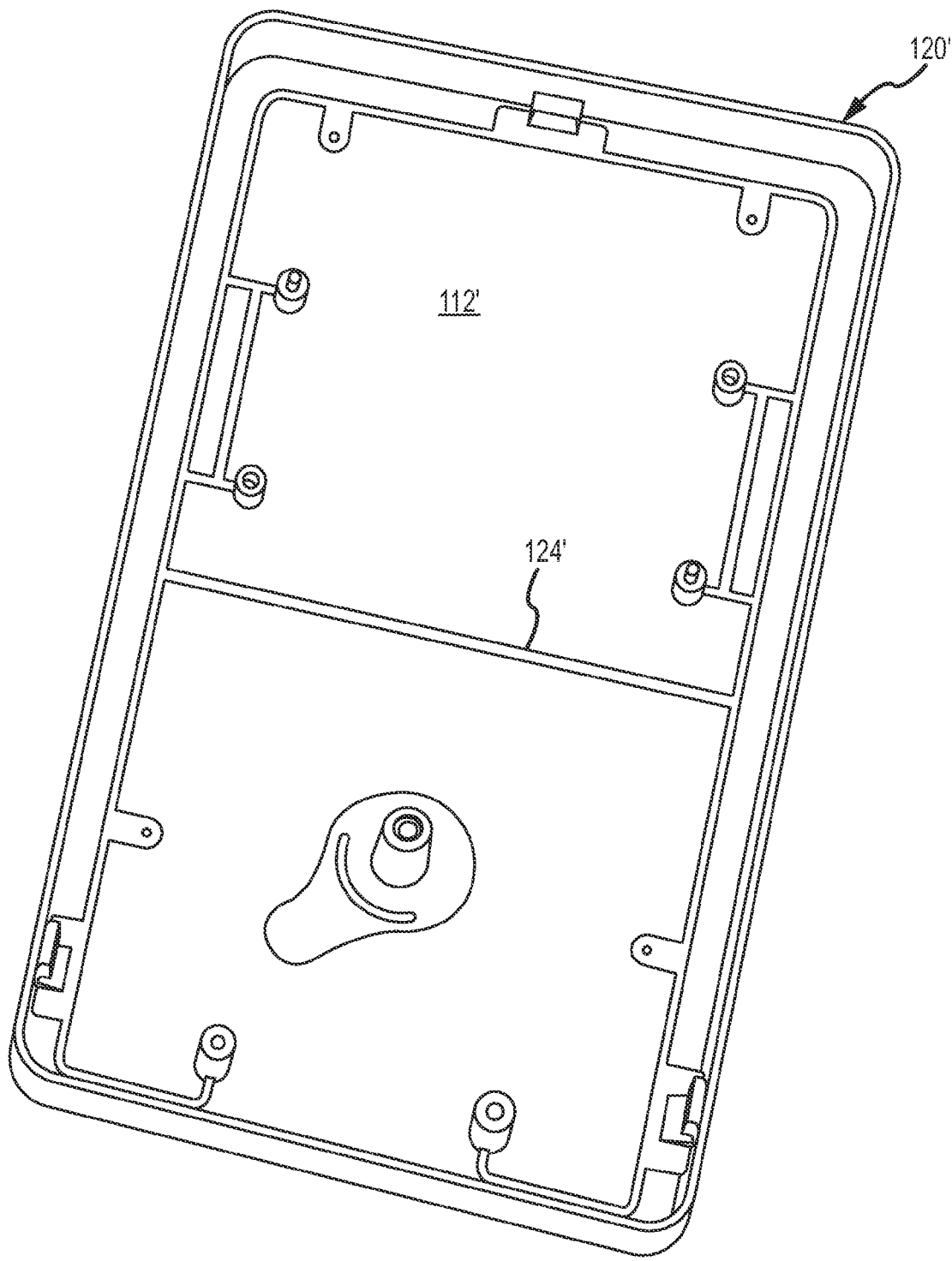
FIG. 3 illustrates a finished part that includes plastic internal structures formed on a metal shell manufactured using the flow diagram of FIG. 2.
Figure 4:
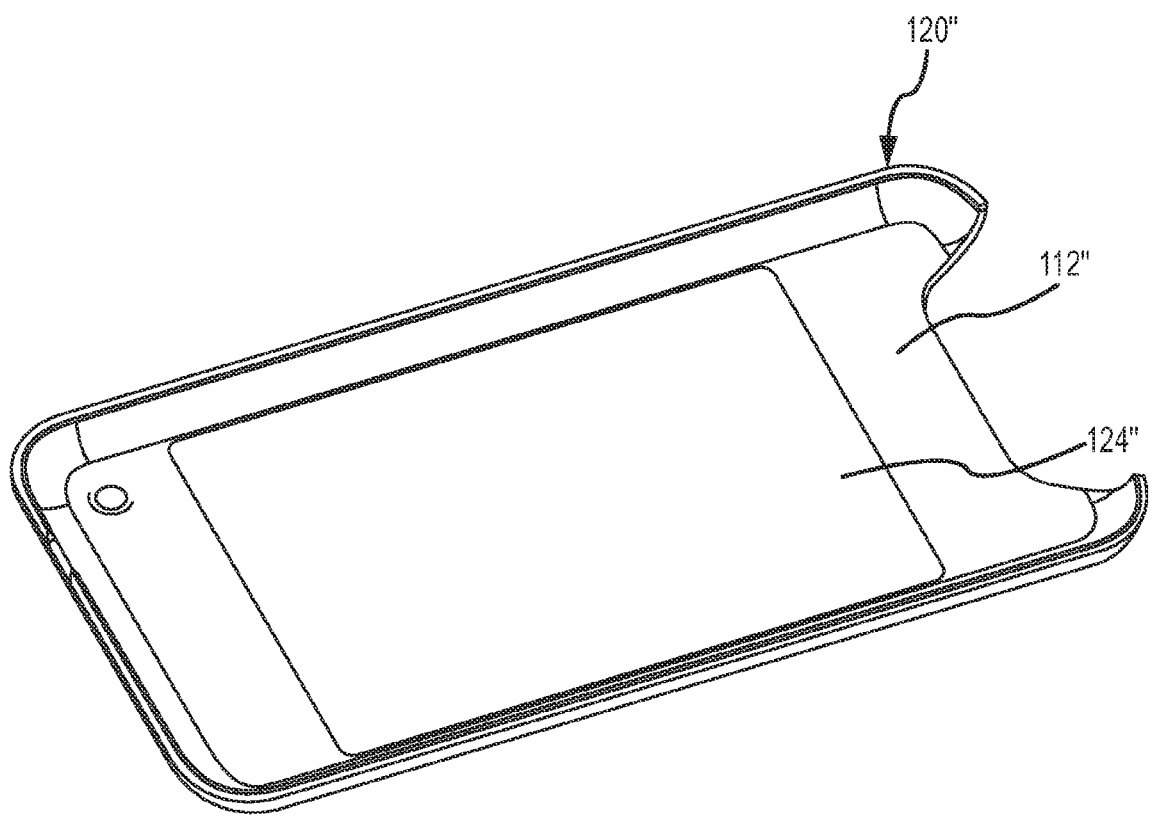
FIG. 4 illustrates an overmolded finished part that includes two plastic molding components manufactured using the flow diagram of FIG. 2.

FIGS. 3-4 illustrate representative examples of finished parts 120', 120" that may be manufactured using the variable mold temperature processes disclosed herein. In FIG. 3, a finished part 120' (e.g., cover of a mobile device such as a notebook, tablet, etc.) includes an insert 112' in the form of a metallic shell in addition to solidified molding material 124' in the form of a series or network of internal plastic structures formed on an inside surface of the insert 112'. In FIG. 4, a finished part 120" (e.g., cover of a mobile device such as a smartphone, etc.) includes an insert 112" in the form of a first molded plastic component in addition to solidified molding material 124" in the form of a second molded plastic component formed on an inside surface of the insert 112".

After the finished part has been removed 228, the method 200 may cycle back to 204 to create additional insert molded or overmolded finished parts (e.g., via repeating some or all of steps 204, 208, 212, 216, 220, 224 and/or 228). In the event that the mold 100 has not yet cooled down to the first temperature just prior to step 204 (i.e., a temperature that inhibits distortion of an insert 112 upon contact or near contact of the insert 112 with the mold 100), the mold 100 may be appropriately cooled (e.g., via one or more of the manners of cooling discussed previously) down to the first temperature for placement 204 of the insert 112 into the mold 100. The mold 100 and method 200 may be associated with any appropriate arrangement of temperature sensors, feedback mechanisms, controllers, and the like (e.g., the multi-functional control unit of the Flextronics Seamless Knitless Process (FSKP) developed by Flextronics International Ltd. of Singapore) operable to cycle the mold 100 between the first, second, third and/or additional temperatures (e.g., via one or more of the above-discussed heating and cooling arrangements) consistent with the teachings presented herein for each successive cycle of an insert molding or overmolding process.

To assist the reader in understanding the teachings presented herein, reference is now made to FIG. 5 which presents a schematic diagram of one cycle 300 of the disclosed variable mold-temperature process. While specific temperatures, cooling/heating times, and the like have been illustrated, it is to be understood that the disclosed process may be practiced in the context of other temperatures, times, and the like in a manner consistent with the teachings presented herein. This particular cycle 300 may begin with an injection stage 304 (e.g., step 216 in FIG. 2) with the mold 100''' at a temperature of 130° C. (although a "cycle" could, of course, begin with any stage and end at the stage just before the beginning stage) in which molding material 154 is injected into a mold cavity 150 of the mold 100'''. In the example of FIG. 5, 130° C. may represent a highest mold temperature of the cycle 300.

After the injection stage 304, the cycle 300 may move to a pressure holding stage 308 in which a holding pressure is applied against the first and/or second molding members 104, 108 (not labeled in FIG. 5) in a direction towards the mold cavity 150 to limit the high pressure injected molding material from forcing the first and second molding members 104, 108 apart before the mold 100 and molding material has fully cooled. In conjunction with or after the pressure holding stage 308, the cycle 300 may include a cooling stage 312 (e.g., step 220 in FIG. 2) in which the mold 100''' is cooled down (e.g., for approximately 18 seconds) to a temperature of 70° C. In the example of FIG. 5, 70° C. may represent a lowest mold temperature of the cycle 300. After the cooling stage 312, the cycle 300 may move to an opening stage 316 in which the mold 100''' may be opened (e.g., step 224 in FIG. 2) and the finished part 120''' ejected (e.g., step 228 in FIG. 2). A new insert 112''' may then be loaded into the mold 100''' with the mold 100''' at the low temperature of 70° C. and then the mold may move to a closing stage 320 (e.g., step 208 in FIG. 2) in which the mold 100''' may be closed about the insert 112''' to constrain the insert 112''' against movement/distortion within the mold cavity 150. In conjunction with or after the closing stage 320, the mold 100''' may be heated up (e.g., for approximately 8 seconds) from 70° C. to 130° C. (e.g., step 212 of FIG. 2). As the insert 112''' is constrained against movement within the mold cavity 150 as the mold 100''' is being heated from 70° C. to 130° C., distortion of the insert 112''' is substantially prevented or at least limited. After the mold temperature has reached 130° C. in this example, the injection stage 304 may again be commenced to begin a new cycle 300.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally," "at least partially," "substantially" or the like in relation to a particular feature encompasses the corresponding characteristic and insubstantial variations thereof. For example, a component that is "substantially aligned" relative to something else covers both an insubstantial variation of the component being aligned in addition to the component being aligned. Finally, a reference of a feature in conjunction with the phrase "in one embodiment" does not limit the use of the feature to a single embodiment.

While the invention has been illustrated and described in detail in the drawings and foregoing description, such illustration and description is to be considered as exemplary and not restrictive in character. As one example, while the present disclosure has generally been in the context of placing a single insert 112 into a mold 100 and injecting a single shot of molten plastic or the like into the mold cavity to contact (e.g., encapsulate, become at least partially integrated with) the insert 112, numerous other more complicated arrangements are envisioned that are encompassed within the scope of the present disclosure. For instance, two or more inserts 112 of the same or different shapes/dimensions may be placed within the mold 100 and secured within the mold cavity which may be injected with one or more shots (e.g., at one or more respective injection temperatures) of molten plastic or other molding material to form a finished part. As another example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

Embodiments disclosed herein can be implemented as one or more computer program products, i.e., one or more modules of computer program instructions encoded on a computer-readable medium for execution by, or to control the operation of, data processing apparatus. For example, the logic or software operable to implement the variable mold temperature insert molding or overmolding processes disclosed herein may be provided in such computer-readable medium of the injection molding system disclosed herein and executed by a corresponding processor or processing engine (not shown). The computer-readable medium can be a machine-readable storage device, a machine-readable storage substrate, a non-volatile memory device, a composition of matter affecting a machine-readable propagated signal, or a combination of one or more of them. In this regard, the injection molding system may encompass one or more apparatuses, devices, and machines for processing data, including by way of example a programmable processor, a computer, or multiple processors or computers. In addition to hardware, the injection molding system may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., performing DR testing, and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as necessarily requiring such separation in all embodiments, and it should be understood that the described program components and systems can generally be integrated together in a single software and/or hardware product or packaged into multiple software and/or hardware products.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

What is claimed is:

1. An injection molding process, comprising:
   obtaining a previously-formed part;
   preheating a mold to a first temperature such that when the mold is at the first temperature, the mold does not cause distortion to the previously-formed part upon contact with the mold, wherein the mold includes a stationary injection mold with at least one sprue through which molding material enters, and a moveable ejector mold that is moveable relative to the injection mold;
   placing the previously-formed part into a cavity of the mold when the mold is at the first temperature;
   closing the mold about the previously-formed part;
   heating, after the closing, the mold from a the first temperature up to a second temperature;
   filling, while at the second temperature, the cavity with molding material such that the molding material contacts the previously-formed part;
   after the filling, maintaining, while at the second temperature, a holding pressure on the previously-formed part with first and second molding members of the mold;
   cooling the mold from the second temperature down to a third temperature that is lower than the first temperature;
   moving the ejector mold away from the injection mold as a finished part remains on the ejector mold, wherein the finished part including the previously-formed part and the injected molding material; and
   using ejector pins that are a part of the mold to eject the finished part off the ejector mold.

2. The injection molding process of claim 1, further including before the placing:
   cooling the mold from the third temperature down to the first temperature, wherein the third temperature is less than the second temperature.

3. The injection molding process of claim 1, wherein the placing includes:
   disposing the previously-formed part between a first mold member and a second mold member of the mold; and
   moving at least one of the first and second mold members towards the other of the first and second mold members to secure the previously-formed part within the mold cavity, wherein the first and second mold members are configured to limit distortion of the previously-formed part during the heating.

4. The injection molding process of claim 1, further including after the using ejector pins:
   continuing to perform the obtaining, preheating, placing, closing, heating, filling, maintaining, cooling, moving and using operations to create additional finished parts.

5. The injection molding process of claim 1, wherein the cooling includes:
   flowing a heat transfer media through the mold.

6. The injection molding process of claim 1, wherein the heating includes:
   flowing a heat transfer media through the mold.

7. The injection molding process of claim 1, wherein the heating includes:
   energizing a heater.

8. The injection molding process of claim 1, wherein the previously-formed part includes metal and/or plastic.

9. An injection molding process, comprising:
   closing a mold about a solidified component when the mold is heated to a first temperature, wherein the first temperature is a temperature at which the mold does not cause distortion to the solidified component upon contact, wherein the mold includes an injection mold with at least one sprue through which molding material enters, and an ejector mold with ejector pins;
   heating, after the closing, the mold from the first temperature up to a second temperature;
   filling, after the heating and while at the second temperature, a cavity with molding material such that the molding material contacts the solidified component;
   maintaining, after the filling and while at the second temperature, a holding pressure on the solidified component with first and second molding members of the mold;
   allowing, after the maintaining, the mold to cool down to a third temperature less than the second temperature and the first temperature so that the molding material solidifies;
   opening the mold such that a finished part remains on the ejector mold, wherein the finished part includes the solidified component and the injected molding material; and removing the finished part from the mold by activating the ejector pins to push out the finished part.

10. The injection molding process of claim 9, further including:
continuing to perform the closing, heating, filling, maintaining, allowing, opening and removing operations to create additional finished parts.

11. The injection molding process of claim 9, wherein the third temperature is closer to the first temperature than the second temperature.

12. The injection molding process of claim 9, wherein when the molding material is injected into the cavity, the molding material encapsulates the solidified component.

13. The injection molding process of claim 9, wherein the closing, the heating, the filling, the maintaining, the allowing, the opening and the removing steps are performed within a single cycle.

14. The injection molding process of claim 9, wherein the heating and the cooling of the mold utilizes passageways extending through the mold.

15. The injection molding process of claim 9, wherein closing the mold about the solidified component also closes about at least one secondary solidified component.

16. The injection molding process of claim 15, wherein each of the solidified component and the at least one secondary solidified component are of the same shapes/dimensions.

17. The injection molding process of claim 15, wherein each of the solidified component and the at least one secondary solidified component are of different shapes/dimensions.

18. The injection molding process of claim 15, wherein the finished part includes both the solidified component and the at least one secondary solidified component.

* * * * *